United States Patent
Nguyen et al.

(10) Patent No.: US 12,140,568 B2
(45) Date of Patent: Nov. 12, 2024

(54) ULTRASONIC BUNDLE SYSTEM

(71) Applicant: Baker Hughes Holdings LLC, Houston, TX (US)

(72) Inventors: Toan Nguyen, Needham, MA (US); Baskaran Ganesan, Acton, MA (US); Oleg Khrakovsky, Lynn, MA (US); Ruben Gonzalez Aldama, Chelmsford, MA (US); Stephen Rehn, Milford, MA (US); Generoso Polcaro, Groton, MA (US)

(73) Assignee: Baker Hughes Holdings LLC, Houston, TX (US)

( * ) Notice: Subject to any disclaimer, the term of this patent is extended or adjusted under 35 U.S.C. 154(b) by 139 days.

(21) Appl. No.: 17/961,602

(22) Filed: Oct. 7, 2022

(65) Prior Publication Data
US 2024/0118247 A1     Apr. 11, 2024

(51) Int. Cl.
*G01N 29/24* (2006.01)
*G01N 29/02* (2006.01)

(52) U.S. Cl.
CPC ......... *G01N 29/2437* (2013.01); *G01N 29/02* (2013.01)

(58) Field of Classification Search
CPC ............................ G01N 29/2437; G01N 29/02
See application file for complete search history.

(56) References Cited

U.S. PATENT DOCUMENTS

| | | | |
|---|---|---|---|
| 5,962,790 A | 10/1999 | Lynnworth et al. | |
| 7,503,225 B2 | 3/2009 | Lang | |
| 8,997,848 B2 | 4/2015 | Quin et al. | |
| 10,487,648 B2 | 11/2019 | Ahmad et al. | |
| 10,557,731 B2 | 2/2020 | Kippersund et al. | |
| 2015/0042206 A1* | 2/2015 | Nguyen | G01F 1/662 310/311 |
| 2024/0118247 A1* | 4/2024 | Nguyen | G01N 29/02 |

OTHER PUBLICATIONS

Huan Zhao; "Enhanced Ultrasonic Techniques for Inspection of Pressure Tubes"; Department of Electronic and Electrical Engineer, University of Strathclyde Engineering; May 2019; 6 pgs.

* cited by examiner

*Primary Examiner* — Daniel Pihulic
(74) *Attorney, Agent, or Firm* — Mintz, Levin, Cohn, Ferris, Glovsky and Popeo, P.C.

(57) ABSTRACT

Ultrasonic probes are provided to abate unwanted signal noise. An ultrasonic probe includes a bundle of rods configured to sample data at a first end and propagate a signal encoding the sampled data to a second end. Each of the rods in the bundle of rods has a substantially similar length and a substantially similar diameter. The ultrasonic probe also includes a shell concentrically disposed around the bundle of rods. The shell is configured to pack the bundle of rods together. The shell includes a plurality of grooves configured to abate a prevailing bulk wave sampled by the first end.

20 Claims, 7 Drawing Sheets

ULTRASONIC BUNDLE SYSTEM

FIELD

Noise abatement systems, techniques, and methods for use with ultrasonic systems are provided.

BACKGROUND

Measuring the characteristics of various media, such as low-molecular-weight gases and other fluids, can be necessary for many industrial processes. Some media may have extreme physical properties, including high temperatures, pressures, and flow rates, which make traditional measurement techniques impossible to use. For decades, buffer rods have provided an effective means to separate a transducer crystal, used in the measurement of media, from the media at interest that are at very high temperatures. The buffer rods can be mounted to a containment structure, such as a tank, a pipe, or similar device, and the media can be found within the containment structure, i.e., stored in a tank or flowing through a pipe. The buffer rods propagate signals gleaned from the media, while preventing damage to the transducer relied on to measure the signals. However, new challenges arise with the use of such buffer rods, including the introduction of signal noise and the possible corruption of signals, thereby interfering with data collection and measurement. It is critical that the buffer rod not corrupt the propagated signals in order to capture accurate data.

Past improvements to buffer rods have been directed at eliminating signal noise, such as noise from sidewall echoes created when longitudinal waves strike the wall near grazing incidence, creating multiple shear waves and resulting in delayed replicas of the original longitudinal pulse. One such improvement to traditional buffer rod systems is described in U.S. Pat. No. 5,962,790 titled "Ultrasonic Path Bundle and Systems," which describes the use of bundled fibers of similar dimension packed within an outer tubular shell. The bundled fibers, numbering in the hundreds or even around a thousand, can be rigidly packed within the shell and used to propagate signals with an improved signal-to-noise ratio (SNR) compared to prior buffer rod systems. However, even these bundled fiber systems still generate signal noise resulting in inconsistent signal readings and general inaccuracy in measurements obtained with such systems.

Accordingly, there remains a need for improving the accuracy of signals propagated through ultrasonic probes.

SUMMARY

Various ultrasonic probes and techniques for abating noise in signals propagated by ultrasonic probes are provided.

In one embodiment, an ultrasonic probe is provided. The ultrasonic probe can include a bundle of rods and a shell concentrically disposed around the bundle of rods. The bundle of rods can be configured to sample data at a first end and propagate a signal encoding the sampled data to a second end. Each of the rods in the bundle of rods can have a substantially similar length and a substantially similar diameter. The shell can be configured to pack the bundle of rods together. The shell can include a plurality of grooves configured to abate a prevailing bulk wave sampled by the first end.

In another embodiment, an ultrasonic probe is provided. The ultrasonic probe can include a shell and a bundle of rods contained within the shell. The shell can have a closed first end. The bundle of rods can be configured to propagate an acoustic signal. Each of the rods in the bundle of rods can be packed together. The shell can include a plurality of grooves located in an outer surface thereof. The plurality of grooves can be configured to abate signal noise propagating through the bundle of rods.

One or more of the following features can be included in any embodiment described herein in any feasible combination. For example, the plurality of external grooves can be regularly disposed along an external surface of the shell. For example, the plurality of external grooves can improve a signal-to-noise ratio (SNR) of sampled data by at least four fold. In some aspects, the plurality of external grooves can improve an SNR of sampled data by at five fold. For example, each of the external grooves in the plurality of external grooves can be shape-cut. In some variations, the shape cute grooves can be square-cut. For example, the shell can be substantially cylindrical. Each of the external grooves in the plurality of external grooves can be substantially equal in dimension and can be radially symmetrical about a central longitudinal axis of the shell. For example, a width of each of the grooves in the plurality of external grooves can be equal to a distance between each of the grooves. In some aspects, the width and the distance can be substantially equal to between about $\frac{1}{3}\lambda$ and $\frac{2}{3}\lambda$, where $\lambda$ is a wavelength of the prevailing bulk wave. In other aspects, the plurality of grooves can be offset from one of the first and second ends by about 0.05 inches to a middle of a buffer coupled to the shell.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

These and Other Features Will be More Readily Understood from the Following Detailed Description Taken in Conjunction with the Accompanying Drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain illustrative embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting illustrative embodiments and that the scope of the present invention is defined solely by the claims. The features illustrated or described in connection with one illustrative embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

Ultrasonic probes and various techniques to abate signal noise in ultrasonic probes are provided. In general, buffer rods (or ultrasonic probes) are provided that include a bundle of packed rods located within an outer protection tube or shell. The outer protection tube can include external grooves capable of abating signal noise propagating through the ultrasonic probe and providing more accurate data collection.

In operation, a first end of the ultrasonic probe can be inserted into a port or a nozzle of a media container and mounted thereto, and a transducer or transducer assembly can be coupled to a second end of the ultrasonic probe. The transducer or transducer assembly can take on various forms, and in some aspects may include a piezoelectric crystal or other material capable of generating piezoelectricity, including various crystals, ceramics, and more. Signals, such as acoustic signals, received from the media can be propagated through the nozzle and ultrasonic probe, and then can be received by the coupled transducer or transducer assembly in order to measure and/or monitor characteristics of the inspected media. Grooves located in an outer surface of the ultrasonic probe can abate signal noise propagating through the ultrasonic probe, such as from a leading bulk wave (e.g., a longitudinal wave), resulting in a greatly-improved signal-to-noise ratio (SNR) of the captured signal. This improved SNR can result in improved measurement and more accurate readings.

Figure 1:
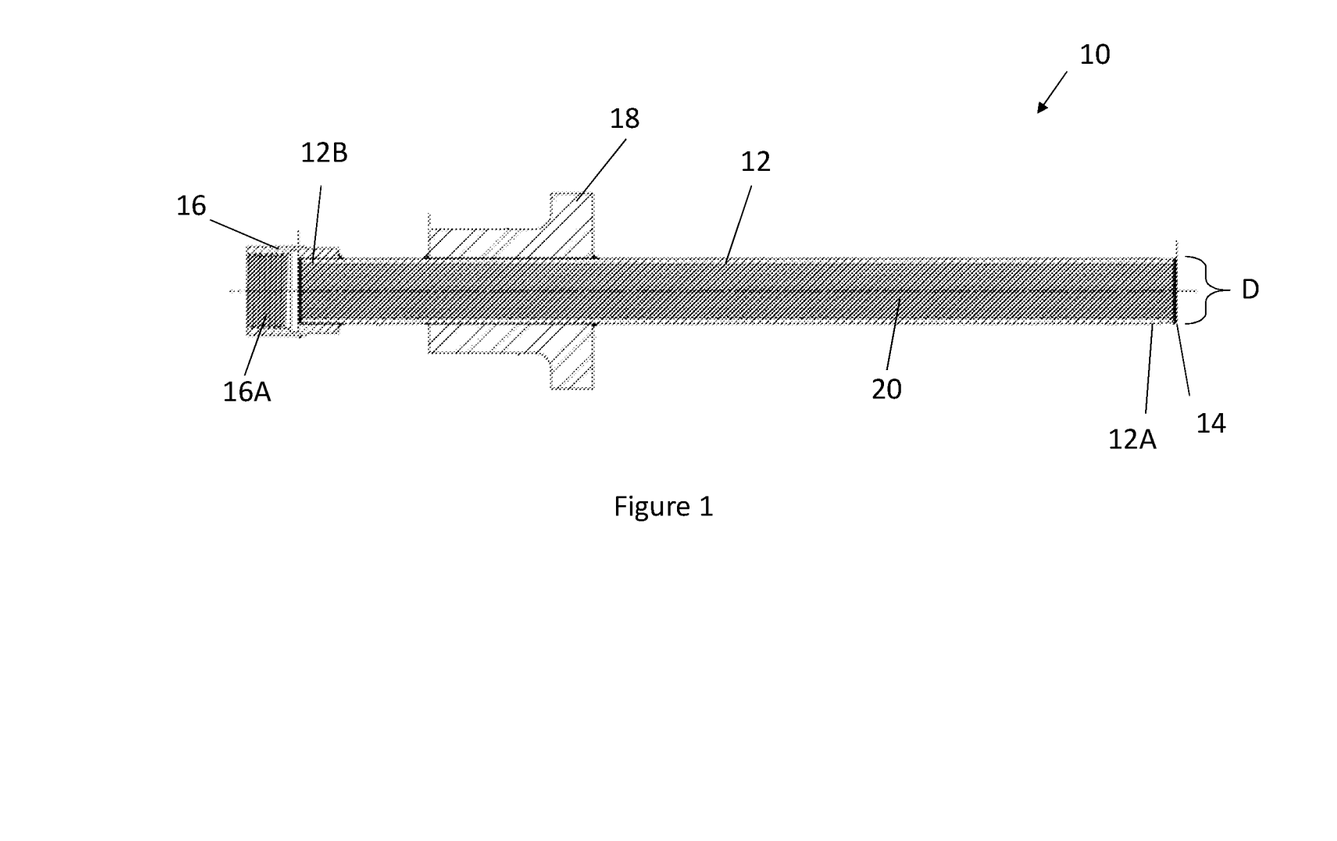
FIG. 1 is cross-sectional view of an ultrasonic probe, according to some embodiments.

An ultrasonic probe 10 according to one embodiment is shown in FIG. 1. While the ultrasonic probe 10 does not include any grooves, the ultrasonic probe 10 provides a baseline upon which embodiments described herein can build. The ultrasonic probe 10 can include an outer protection tube 12 (or outer shell) having a substantially cylindrical form and defining a central lumen therein. The outer protection tube 12 can have a welded tip 14 located at a first end 12A thereof to close off the central lumen. A second end 12B can be affixed to a coupling link 16, which can include threads 16A configured to receive a transducer assembly (not shown). The outer protection tube 12 can have varied sizes and dimensions. For example, in some aspects, an outer diameter D of the outer protection tube 12 can be about one inch in length and can have a wall thickness been about 0.020 and 0.125 inches, and in some variations, the wall thickness can be approximately 0.095 inches. An outer flange 18 can be concentrically disposed around the outer protection tube 12. The outer flange 18 can include components, including threaded holes (not shown), which can assist in mating the ultrasonic probe 10 to a media container (not shown). For example, bolts can be threaded through the threaded holes and into a bulkhead of the media container in order to secure the ultrasonic probe 12 thereto.

The outer protection tube 12 can house a plurality of packed rods 20 in the form of welding wires running longitudinally through the outer protection tube 12. The rods 20 can number in the hundreds or even a thousand or more, and they can be sized to occupy a minimal diameter within the outer protection tube 12. Each of the rods 20 can have the same dimensions, and for example, each of the rods 20 can have a diameter D of between about 0.02 and 0.05 inches, and in some aspects, D can be approximately 0.035 inches. Each of the rods 20 can be attached to interior faces of the first and second ends 12A, 12B of the outer protection tube 12, such as an inner face of the welded tip 14, however they can be separate from one another along their respective sides. Each of the rods 20 can be made from a same material, or the rods 20 can vary materially. For example, each of the rods 20 can be steel, although those skilled in the art will understand that a variety of materials effective at propagating signals can be used.

As explained above, ultrasonic probes containing bundles of rods can still produce signal noise when signals are propagated therethrough. The use of grooving in an outer surface of the ultrasonic probes can greatly improve an SNR of the probe by causing destructive interference of aberrant signals. Examples of ultrasonic probes having grooves, as well as their performance at specific signal parameters, are depicted in FIGS. 2-7. Although the grooves may be depicted in a certain form, the number, shape, location, and dimension of the grooves, whether individually or as a collective, can vary. Moreover, the groove or grooves can be shaped, positioned, and dimensioned to target specific ranges of signal noise, or to influence an overall signal based on various factors, including the dimensions, materials, and properties of one or more of the ultrasonic probe, the transducer or transducer assembly, and the media at interest.

Figure 2:
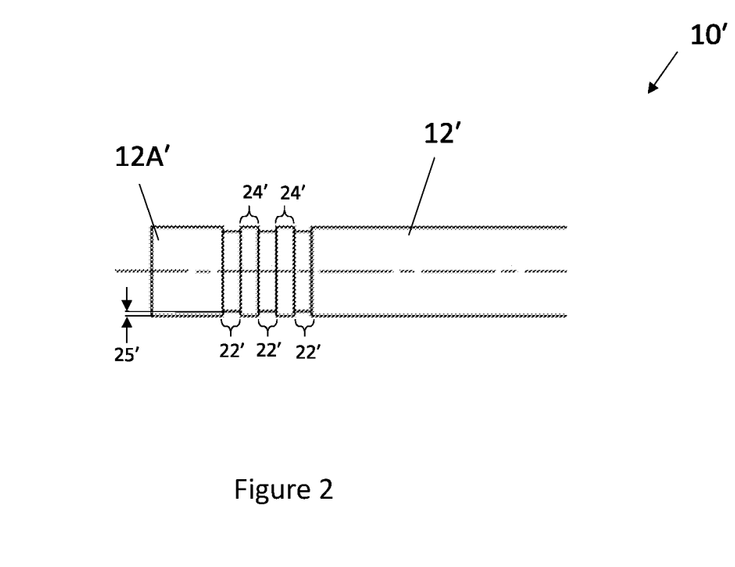
FIG. 2 is a side view of an ultrasonic probe having three grooves in an outer shell, according to an embodiment.

For example, FIG. 2 depicts an ultrasonic probe 10' that includes three grooves 22' in an exterior thereof. The ultrasonic probe 10' can be include all of the elements of ultrasonic probe 10, and for brevity, like components will not be described again in detail. At least one difference between the ultrasonic probe 10 and the ultrasonic probe 10' is the addition of grooves 22', which can abate signal noise propagating through the ultrasonic probe 10'. The overall size of the ultrasonic probe 10' can vary, and in some embodiments, it may be at least 12 inches in length. Further, the ultrasonic probe 10', in some aspects, can be about 14.25 inches in length.

The grooves 22' can be located within an outer protection tube 12', and they are shown closer to a first end 12A' of the outer protection tube 12'. Each of the grooves 22' can be shape-cut, as shown in FIG. 2, or can be cut in other regular or arbitrary forms, including being generally square-cut or rectangular-cut, for example. Ridges 24' can separate each of the grooves 22'. As explained above, the specific form and dimensions of each of the grooves 22' and the ridges 24', as well as their placement, can vary. For example, each of the grooves 22' and the ridges 24' can each have a width of between about $\frac{1}{3}\lambda$ to $\frac{2}{3}\lambda$, where $\lambda$ is a wavelength of a prevailing bulk wave. Each of the grooves 22' can have a depth 25' equal to between about 45% to 90% of a thickness of an outer wall of the outer protection tube 12'. The first groove 22' located closest to the first end 12A' can be positioned about 0.05 inches from the first end 12A', although in some aspects, the first groove 22' can be located closer to the second end 12B', and in some variations, this distance can be about 0.05 inches.

Figure 3:
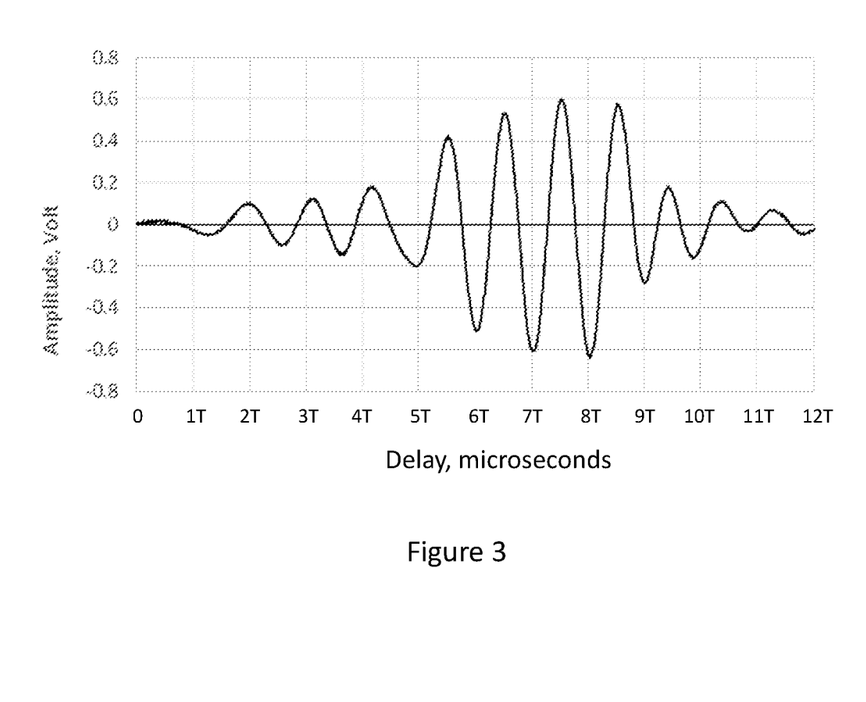
FIG. 3 is a graphic depicting a signal at a frequency ranging from 100 kHz to 1 MHz in an ultrasonic probe having the dimensions of the ultrasonic probe of FIG. 2 without external grooves.

When an ultrasonic probe having dimensions equal to the ultrasonic probe 10' but without the grooves 22' propagates a signal, that signal can be represented as voltage variance as a function of time. FIG. 3 depicts a graphical plot, time on the x-axis in microseconds and amplitude on the y-axis in volts, of a signal propagating through an ultrasonic probe having dimensions equal to the ultrasonic probe 10' but without the grooves 22'. While a four-pulse signal is depicted, the signal could have an arbitrary number of pulses, for example, one to six pulses. The four main pulses can be seen at approximately 5.5T, 6.6T, 7.5T and 8.5T microseconds, where T is the inverse of the frequency of the signal, also known as the period, peaking at around 0.4, 0.5, 0.6, and 0.6 volts, respectively. The frequency of the signal can range from about 100 kHz to about 1 MHz. The remainder of the plot, especially at between about 0 and 5T microseconds, shows minor pulses in addition to the four main pulses. These minor pulses are a form of noise in the signal. Additional noise can be seen in the plot at between about 9T and 12T microseconds.

Figure 4:
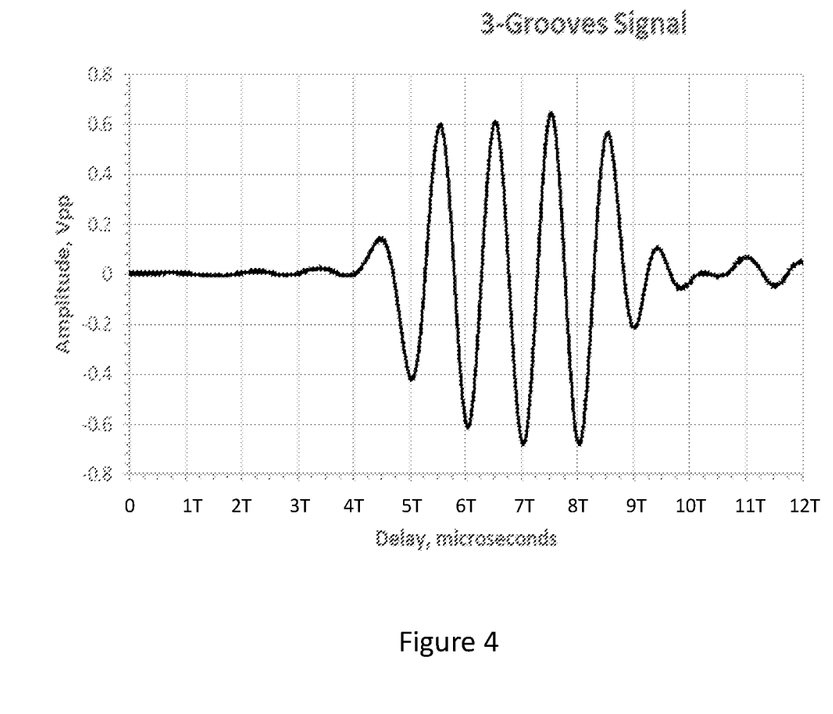
FIG. 4 is a graphic depicting a signal at a frequency ranging from 100 kHz to 1 MHz in the ultrasonic probe of FIG. 2.

FIG. 4 depicts a graphical plot of the same signal of FIG. 3 propagating through the ultrasonic probe 10', which includes three grooves 22' as explained above. In the graphical plot of FIG. 4, the four pulses can be seen again at about 5.5T, 6.6T, 7.5T and 8.5T microseconds, however their amplitudes have increased substantially to about 0.6, 0.6, 0.62, and 0.58 volts, respectively. Moreover, in both the regions before and after the four main pulses, the voltage variance has dropped considerably. In fact, in practice, the addition of the three grooves 22' has been measured to increase SNR by at least five fold, and in some aspects, by between about five and eight fold or more.

Figure 5:
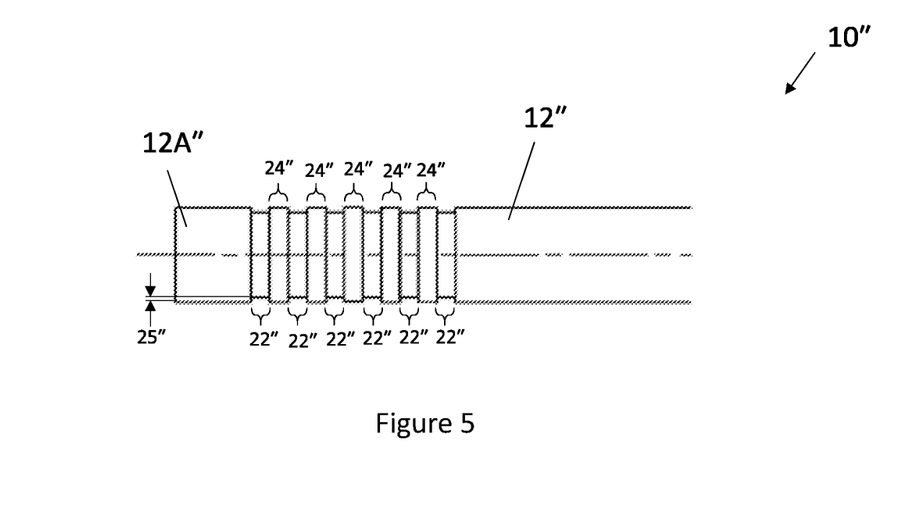
FIG. 5 is a side view of an ultrasonic probe having six grooves in an outer shell, according to an embodiment.

FIG. 5 depicts an ultrasonic probe 10", which is substantially similar in construction to both ultrasonic probe 10 and the ultrasonic probe 10', except that the ultrasonic probe 10" has six grooves 22" in an external surface thereof. The grooves 22", as illustrated, have the same dimensions as the grooves 22', including a groove depth 25", although the grooves 22" can vary just as described above with respect to the grooves 22'. One difference between the ultrasonic probe 10" and the ultrasonic probe 10' can be a length. The ultrasonic probe 10" can be at least 20 inches in length, and in some embodiments can be at least about 22.25 inches in length.

Figure 6:
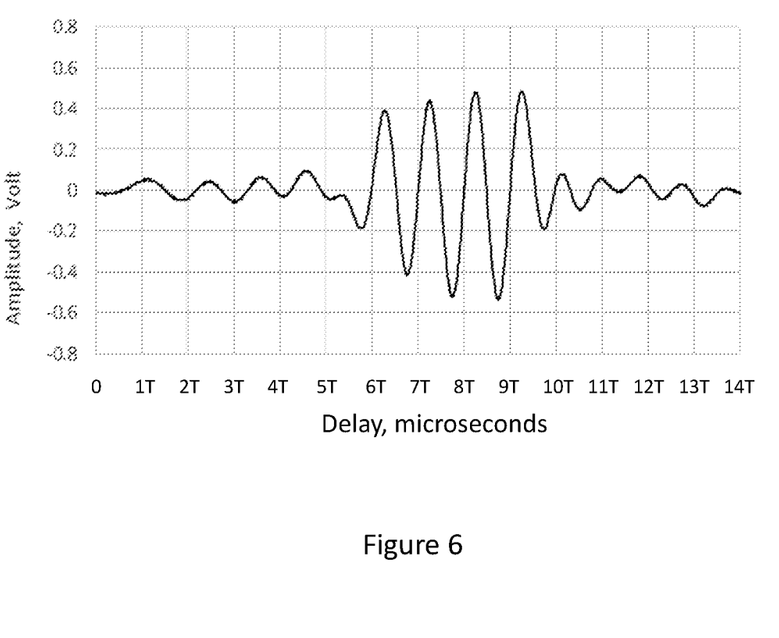
FIG. 6 is a graphic depicting a signal at a frequency ranging from 100 kHz to 1 MHz in an ultrasonic probe having the dimensions of the ultrasonic probe of FIG. 5 without external grooves.

FIG. 6 depicts a graphical plot, time on the x-axis in microseconds and amplitude on the y-axis in volts, of a signal propagating through an ultrasonic probe having dimensions equal to the ultrasonic probe 10" but without the grooves 22". While a four-pulse signal is depicted, the signal could have an arbitrary number of pulses, for example, one to six pulses. The four main pulses can be seen at approximately 6.25T, 7.25T, 8.25T, and 9.25T microseconds, peaking at around 0.4, 0.45, 0.5, and 0.5 volts, respectively. The remainder of the plot, especially at between about 0 and 5T microseconds, shows minor pulses in addition to the four main pulses. These minor pulses are a form of noise in the signal. Additional noise can be seen in the plot at between about 10T-14T microseconds.

Figure 7:
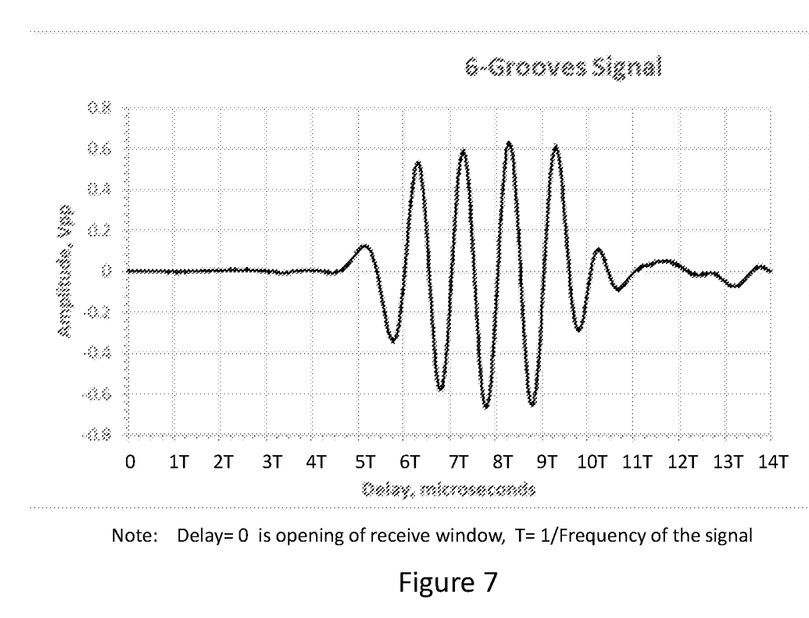
FIG. 7 is a graphic depicting a signal at a frequency ranging from 100 kHz to 1 MHz in the ultrasonic probe of FIG. 5.

FIG. 7 depicts a graphical plot of the signal of FIG. 6 propagating through the ultrasonic probe 10", which includes three grooves 22" as explained above. In the graphical plot of FIG. 6, the four pulses can be seen again at about 6.25T, 7.25T, 8.25T, and 9.25T microseconds, however their amplitudes have increased substantially to about 0.56, 0.6, 0.62, and 0.6 volts, respectively. Moreover, in both the regions before and after the four main pulses, the voltage variance has dropped considerably. In fact, in practice, the addition of the six grooves 22" has been measured to increase SNR by at least four fold, and in some aspects, by between about four and seventeen fold or more.

Certain illustrative implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting illustrative implementations and that the scope of the present invention is defined solely by the claims. The features illustrated or described in connection with one illustrative implementation may be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described implementations. Accordingly, the present application is not to be limited by what has been particularly shown and described, except as indicated by the appended claims. All publications and references cited herein are expressly incorporated by reference in their entirety.

What is claimed is:

1. An ultrasonic probe, comprising:
    a bundle of rods configured to sample data at a first end and propagate a signal encoding the sampled data to a second end, each of the rods in the bundle of rods having a substantially similar length and a substantially similar diameter; and
    a shell concentrically disposed around the bundle of rods and configured to pack the bundle of rods together, the shell including a plurality of external grooves configured to abate a prevailing bulk wave sampled by the first end.

2. The ultrasonic probe of claim 1, wherein each of the plurality of external grooves is regularly disposed along an external surface of the shell.

3. The ultrasonic probe of claim 1, wherein the plurality of external grooves improves a signal-to-noise ratio (SNR) of sampled data by at least four fold.

4. The ultrasonic probe of claim 3, wherein the plurality of external grooves improves an SNR of sampled data by at least five fold.

5. The ultrasonic probe of claim 1, wherein each of the plurality of external grooves in the plurality of external grooves is shape-cut.

6. The ultrasonic probe of claim 5, wherein the shape-cut grooves are square-cut.

7. The ultrasonic probe of claim 1, wherein the shell is substantially cylindrical, and wherein each groove in the plurality of external grooves is substantially equal in dimension and is radially symmetrical about a central longitudinal axis of the shell.

8. The ultrasonic probe of claim 1, wherein a width of each groove in the plurality of external grooves is equal to a distance between each of the grooves.

9. The ultrasonic probe of claim 8, wherein the width and the distance are substantially equal to between about $\frac{1}{3}\lambda$ and $\frac{2}{3}\lambda$, where $\lambda$ is a wavelength of the prevailing bulk wave.

10. The ultrasonic probe of claim 8, wherein the plurality of external grooves is offset from one of the first and second ends by about 0.05 inches to a middle of a buffer coupled to the shell.

11. An ultrasonic probe, comprising:
a shell having a closed first end; and
a bundle of rods contained within the shell and configured to propagate an acoustic signal, each of the rods in the bundle of rods being packed together;
wherein the shell includes a plurality of external grooves located in an outer surface thereof, the plurality of external grooves being configured to abate signal noise propagating through the bundle of rods.

12. The ultrasonic probe of claim 11, wherein the plurality of external grooves are regularly disposed along an external surface of the shell.

13. The ultrasonic probe of claim 11, wherein the plurality of external grooves improve a signal-to-noise ratio (SNR) of sampled data by at least four fold.

14. The ultrasonic probe of claim 13, wherein the plurality of external grooves improve an SNR of sampled data by at least five fold.

15. The ultrasonic probe of claim 11, wherein each of the external grooves in the plurality of external grooves is shape-cut.

16. The ultrasonic probe of claim 15, wherein the shape-cut grooves are square-cut.

17. The ultrasonic probe of claim 11, wherein the shell is substantially cylindrical, and wherein each of the external grooves in the plurality of external grooves is substantially equal in dimension and is radially symmetrical about a central longitudinal axis of the shell.

18. The ultrasonic probe of claim 11, wherein a width of each of the grooves in the plurality of external grooves is equal to a distance between each of the grooves.

19. The ultrasonic probe of claim 18, wherein the width and the distance are substantially equal to between about $\frac{1}{3}\lambda$ and $\frac{2}{3}\lambda$, where $\lambda$ is a wavelength of a prevailing bulk wave.

20. The ultrasonic probe of claim 17, wherein the plurality of external grooves is offset from one of the first and second ends by about 0.05 inches to a middle of a buffer coupled to the shell.

* * * * *